Jan. 9, 1951
L. RIEBMAN
2,537,090
SYSTEM FOR MAINTAINING MAXIMUM PULSE
DEFINITION ON HIGH Q NETWORKS
Filed Aug. 6, 1945
2 Sheets-Sheet 1

Inventor
LEON RIEBMAN

By Ralph L. Chappell
Attorney

Jan. 9, 1951 | L. RIEBMAN | 2,537,090

SYSTEM FOR MAINTAINING MAXIMUM PULSE DEFINITION ON HIGH Q NETWORKS

Filed Aug. 6, 1945 | 2 Sheets-Sheet 2

Inventor
LEON RIEBMAN

By Ralph L Chappell
Attorney

Patented Jan. 9, 1951

2,537,090

UNITED STATES PATENT OFFICE 2,537,090

SYSTEM FOR MAINTAINING MAXIMUM PULSE DEFINITION ON HIGH Q NETWORKS

Leon Riebman, United States Navy

Application August 6, 1945, Serial No. 609,294

5 Claims. (Cl. 178—44)

(Granted under the act of March 3, 1883, as amended April 30, 1928; 370 O. G. 757)

This invention relates to a method of and a means for maintaining maximum definition of electrical impulses where such impulses are to be passed through electrical networks which are readily shocked into damped oscillations.

For various purposes in the art, it is necessary that pulses of electrical energy be applied to networks having the property that their capacity for energy storage is high in relation to the energy which they dissipate; i. e. high Q networks. Leading and trailing edges of pulses usually contain high frequency components which tend to shock excite damped oscillations in such networks. The oscillations excited by the trailing edges will normally start with a phase which is the opposite of that with which those excited by the leading edges start. Consequently, after the end of the pulse, damped oscillations which are the sum of those started by the pulse edges will continue at the output of the network. When comparatively short pulses are applied to a high Q network, the amplitude of the remaining oscillations will depend upon the resonant frequency or frequencies of the network and the pulse duration, and can vary from approximately twice the initial amplitude to a negligible value according to the phase angle at which the two sets of oscillations add. In the general case, however, these oscillations will impair the pulse definition at the output, and their continuance will temporarily render the output circuits ineffective for subsequent signals. The present invention provides a method of and means for terminating such oscillations by cancellation. Cancellation is effected after a fixed period of time through the use of circuit elements designed for that purpose. It will be apparent from the following description that, because of the timing relationships inherent in the operation of the invention, an exact reproduction of the input pulse is not rendered directly available. However, the output waveforms are such that, either they are intelligible to those skilled in the operation of equipments with which the invention is used, or they lend themselves to modification in circuits known to the art so that they can be interpreted. Moreover, the output circuits will be returned to effective operation in a minimum time.

Other objects and features of the present invention will become apparent upon a careful consideration of the following detailed description when taken together with the accompanying drawings.

Figure 1:
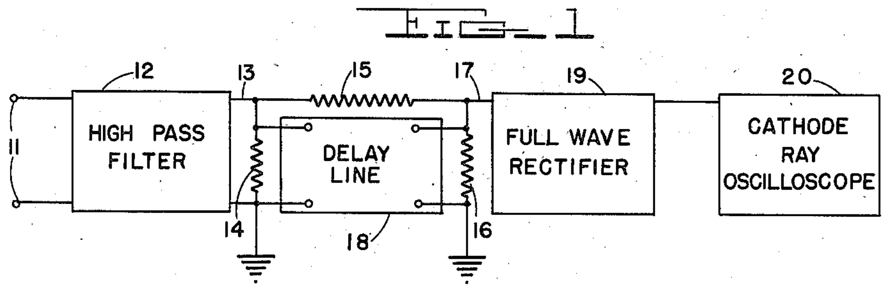
Fig. 1 is a schematic diagram of one embodiment of the invention in which rectangular pulses must be passed through a high pass filter.
Figure 1A:
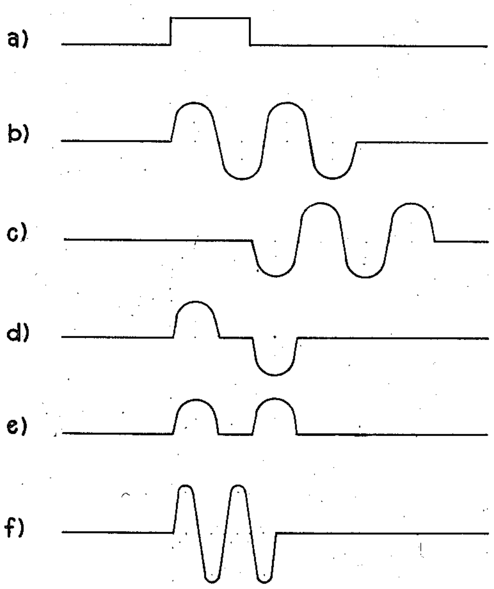
Fig. 1A is a series of waveforms useful in explaining the operation of the circuit shown in Fig. 1.

In particular Fig. 1 illustrates an embodiment of the invention in which a signal comprising rectangular pulses must be passed through a high "Q" high pass filter 12. The significant portion of the input signal applied at terminal 11 is shown at waveform *a* in Fig. 1A. The leadnig edge of the pulse shock excites damped oscillations in the filter network 12 which appear at the filter output 13 as waveform *b* (shown without regard to time delay in the high pass filter). The trailing edge of the pulse shock excites damped oscillations of opposite initial polarity which appear as waveform *c* (also shown without regard to time delay in the high pass filter) at terminal 13. The two groups of damped oscillations illustrated in waveforms *b* and *c* respectively combine after the termination of the pulse to form a composite waveform, but for purposes of clarity each group may be considered separately with regard to their behavior in the cancellation network. The frequencies contained in the input pulse are for the most part in the attenuation band of the filter and do not appear at output terminal 13. The cancellation network comprises a resistive channel 15 through which the filter output is passed substantially unmodified in parallel with an artificial line channel 18 in which the filter 12 output is attenuated and delayed one half period or any suitable odd number of one half periods if desired. The line 18 is driven and terminated by a pair of resistors, 14 and 16, which in combination with the series, resistive element 15 form a pi type network. To prevent the occurrence of reflections in line 18 resistors 14 and 16 are made equal to the characteristic impedance of the line. When signals passing through the two channels are recombined at 17, all except the first half cycle (due to the half cycle delay introduced by line 18) of each group of ringing oscillations will be cancelled. Consequently, the output at 17 will appear substantially as shown by waveform *d*, i. e., as two displaced half cycles of opposite polarity whose displacement is a function of pulse width and the period of the damped oscillations. After the second half cycle, the circuit is receptive to subsequent pulses.

Waveform *d* contains indications of the pulse width which can be interpreted by a skilled operator from a suitable presentation on a cathode ray oscilloscope, for example. Accordingly, the output waveform *d* is applied to a full wave rectifier 19, the output of which appears on cathode ray oscilloscope 20 as shown in waveform *e*. The pulse length is thus defined by the leading edges of the adjacent half waves.

Figure 2:
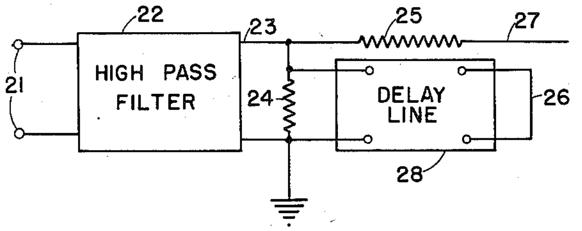
Figs. 2 and 3 are schematic diagrams of typical modifications of the embodiment shown in Fig. 1.

Fig. 2 illustrates a modification of the embodiment shown in Fig. 1. In this modification the delay line 28 is terminated in a short circuit 26, so as to not only delay the output from the high pass filter 22 the desired amount but to reflect it back to terminal 23 with a phase reversal. These reflections will then combine with the original output at terminal 23. Thus since the reflections appearing at terminal 23 are phase reversed the delay provided by line 28 should equal an even integral number of one-half periods for proper cancellation of damped oscillations.

Figure 3:
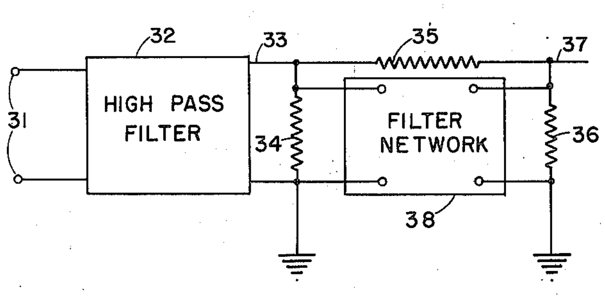

Fig. 3 illustrates a second modification of the embodiment in Fig. 1. If a plurality of ringing frequencies are excited in the high pass filter 32, a second filter network 38 is used in place of a delay line. Filter network 38 is designed to have its cut-off frequency in the region of the ringing frequencies in order that each such frequency will experience a 180 degree phase shift. This filter like lines 18 and 28 in Figs. 1 and 2 must also be designed to have attenuation properties such that upon recombination at terminal 37 each frequency will approach cancellation after the time delay introduced by the filter 38. The output waveform will again provide the basic definition of pulse width. In other words the attenuation property of lines 18 and 28 as well as filter 38 is a function of the delay introduced by the delay networks and the decay factor of the damped oscillations applied thereto.

Figure 4:
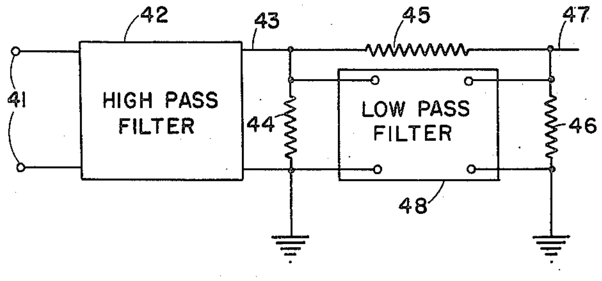
Fig. 4 shows an application in a receiver circuit in which pulses comprising several cycles of an approximate sine wave must be passed through a high pass filter.

Fig. 4 illustrates another embodiment of this invention in which the input signal at terminal 41 is a pulse comprising several cycles of an approximate sine wave as shown by the oscillogram *f*. The high pass filter 42 will pass the signal frequency and is excited into damped oscillations by the wave shape of this signal. The damped oscillations are cancelled at terminal 47 substantially as before. A low pass filter 8 is used in the channel in which the damped oscillations are attenuated, delayed, and phase shifted. This filter passes the damped oscillations, but is so designed that the original input signal is in its attenuation band. Consequently, the original input signal frequency is not cancelled at terminal 47, but the damped oscillations are.

It is apparent that for use with this invention the high and low pass filters must be designed so that the frequencies applied will be shifted 180 degrees in phase and so that the attenuation requirements of the frequency or frequencies present will be met. High pass filters are used when the required attenuation decreases with increasing frequency; low pass filters are used when the opposite requirement exists.

Although I have shown and described only certain and specific embodiments of the invention it is to be understood that I am fully aware of the many modifications possible thereof. Therefore this invention is not to be restricted except insofar as is necessitated by the prior art and the spirit of the appended claims.

The invention described herein may be manufactured and used by or for the Government of the United States of America for governmental purposes without the payment of any royalties thereon or therefor.

What is claimed is:

1. In electrical networks through which electrical impulses are to be passed and which are readily shocked into damped oscillations in response to the application of such impulses, a method of maintaining maximum pulse definition, which comprises, dividing the damped oscillations which result from the application of an impulse to a network into two identical groups, subjecting one of said groups to an interval of delay determined by the frequency of the damped oscillations, attenuating said one of said groups to an extent determined by the decay factor of the damped oscillations recombining said one of said groups with the other of said groups, said interval of delay being such that complete cancellation of the recombined oscillations result, and determining the impulse duration by measuring the time separation between the remaining oscillations of the respective groups.

2. In electrical networks through which electrical impulses are to be passed and which are readily shocked into damped oscillations in response to the application of such impulses, a method of maintaining maximum pulse definition, which comprises dividing the damped oscillations which result from the application of an impulse to a network into two identical groups, subjecting one of said groups to an odd integral number of one-half periods of delay, attenuating said one of said groups to an extent determined by the decay factor of the damped oscillations, recombining said one of said groups with the other of said groups whereby complete cancellation of the recombined oscillations result, and determining the impulse duration by measuring the time separation between the remaining oscillations of the respective groups.

3. In electrical networks through which electrical impulses are to be passed and which are readily shocked into damped oscillations in response to the application of such impulses, a means for maintaining maximum pulse definition comprising, a pi type electrical network having one series and two shunt legs, said pi network connected at one end to the network in which damped oscillations are excited, the other end of said pi network forming an output terminal, a delay means connected between the shunt legs of said pi network, said delay means acting to delay the damped oscillations applied thereto by an amount equal to an odd integral of one-half periods, said delay means also acting to attenuate the oscillations applied thereto.

4. In electrical networks through which electrical impulses are to be passed and which are readily shocked into damped oscillations in response to the application of such impulses, a means for maintaining maximum pulse definition comprising, an impedance element having input and output terminals, the input terminal of said impedance element being connected to the network in which damped oscillations are excited, and an artificial transmission line connected in shunt with said impedance element, said line short circuited at one end to provide reflection with inversion, said line acting to delay, invert and attenuate the damped oscillations applied thereto, said delay interval being equal to an even integral number of one half periods.

5. In electrical networks through which electrical impulses are to be passed and which are readily shocked into damped oscillations in response to the application of such impulses, a means for maintaining maximum pulse definition comprising, a pi type electrical network having one series resistive leg and two shunt resistive legs, said pi network connected at one end to the network in which damped oscillations are excited, the other end of said pi network forming an output terminal, a filter circuit connected between the shunt legs of said pi network, said filter circuit arranged to provide a 180 degrees phase shift of the damped oscillations applied thereto, said filter network also arranged to attenuate damped oscillations applied thereto.

LEON RIEBMAN.

REFERENCES CITED

The following references are of record in the file of this patent:

UNITED STATES PATENTS

| Number | Name | Date |
|---|---|---|
| 2,144,812 | Rieber | Jan. 24, 1939 |
| 2,236,134 | Gloess | Mar. 25, 1941 |
| 2,310,692 | Hansell | Feb. 9, 1943 |
| 2,377,903 | Rieber | June 12, 1945 |
| 2,386,088 | Bingley et al. | Oct. 2, 1945 |
| 2,410,233 | Percival | Oct. 29, 1946 |